United States Patent
Cheon et al.

(10) Patent No.: US 10,214,246 B2
(45) Date of Patent: Feb. 26, 2019

(54) BONNET MOUNTING APPARATUS OF AGRICULTURAL WORK VEHICLE

(71) Applicant: DAEDONG INDUSTRIAL CO., LTD., Daegu (KR)

(72) Inventors: Seok Ki Cheon, Gyeongsangnam-do (KR); Moon Il Lee, Gyeongsangnam-do (KR)

(73) Assignee: DAEDONG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 15/514,561

(22) PCT Filed: Jun. 12, 2015

(86) PCT No.: PCT/KR2015/005921
§ 371 (c)(1),
(2) Date: Mar. 27, 2017

(87) PCT Pub. No.: WO2016/052833
PCT Pub. Date: Apr. 7, 2016

(65) Prior Publication Data
US 2017/0225716 A1     Aug. 10, 2017

(30) Foreign Application Priority Data
Sep. 30, 2014 (KR) .......................... 10-2014-0131821

(51) Int. Cl.
*B62D 25/12* (2006.01)
*B62D 49/00* (2006.01)
(Continued)

(52) U.S. Cl.
CPC ............ *B62D 25/12* (2013.01); *B62D 49/00* (2013.01); *B62D 65/06* (2013.01); *E05D 5/0207* (2013.01)

(58) Field of Classification Search
CPC ........ B62D 25/12; B62D 49/00; E05D 5/0207
See application file for complete search history.

(56) References Cited

U.S. PATENT DOCUMENTS

| 4,753,475 A | * | 6/1988 | Mochida | ................ B62D 25/12 180/69.21 |
| 8,628,141 B1 | * | 1/2014 | Thorpe | .................. B62D 25/12 180/69.2 |

(Continued)

FOREIGN PATENT DOCUMENTS

| EP | 0570054 A1 | 11/1993 |
| FR | 2 508 962 A1 | 1/1983 |

(Continued)

OTHER PUBLICATIONS

Search Report, dated Sep. 1, 2015, for International Application No. PCT/KR2015/005921.

(Continued)

*Primary Examiner* — Drew J Brown
(74) *Attorney, Agent, or Firm* — LRK Patent Law Firm

(57) ABSTRACT

A bonnet mounting apparatus of an agricultural work vehicle enables a bonnet that covers an engine compartment of an agricultural work vehicle to be opened upward. The bonnet mounting apparatus includes: a fastener on which a coupling protrusion is provided, and which is attached to the inside of one end portion of a bonnet; and a hinge on which a coupling recess, into which the coupling protrusion is inserted, is provided, and which is hingedly coupled to the upper end of a bonnet support at a vehicle body side so as to be rotatable upward and downward. According to the present invention, the bonnet is easily connected to the vehicle body by inserting the coupling protrusion of the bonnet into the coupling recess of the hinge at the vehicle body side.

3 Claims, 5 Drawing Sheets

(51) Int. Cl.
    *E05D 5/02*    (2006.01)
    *B62D 65/06*   (2006.01)

(56) References Cited

U.S. PATENT DOCUMENTS

| | | | | |
|---|---|---|---|---|
| 8,863,879 | B1* | 10/2014 | Domlovil | B62D 25/12 |
| | | | | 180/69.2 |
| 8,899,363 | B1* | 12/2014 | LaPorte | B62D 25/12 |
| | | | | 180/69.2 |
| 9,868,472 | B2* | 1/2018 | Takada | B60R 21/34 |
| 9,914,485 | B2* | 3/2018 | Hammer | B62D 25/12 |
| 2002/0170759 | A1* | 11/2002 | Son | B62D 25/12 |
| | | | | 180/69.21 |
| 2004/0124621 | A1* | 7/2004 | Knight-Newbury | B60R 21/38 |
| | | | | 280/748 |
| 2015/0292248 | A1* | 10/2015 | Fisher | E05D 7/1083 |
| | | | | 56/16.7 |
| 2017/0080984 | A1* | 3/2017 | Jung | B29C 66/304 |

FOREIGN PATENT DOCUMENTS

| | | | | |
|---|---|---|---|---|
| FR | 2937993 A1 * | 5/2010 | | B60Q 1/0466 |
| JP | 11-198859 A | 7/1999 | | |
| KR | 20-1999-0025151 U | 7/1999 | | |
| KR | 20-1999-0026512 U | 7/1999 | | |
| WO | 90/07622 A1 | 7/1990 | | |
| WO | 2014-013937 A1 | 1/2014 | | |
| WO | 2014/062155 A1 | 4/2014 | | |
| WO | 2014/081196 A1 | 5/2014 | | |
| WO | WO-2014081196 A1 * | 5/2014 | | B62D 25/12 |

OTHER PUBLICATIONS

IP Australia Office Action, dated May 23, 2018, for Australian Patent Application No. 2015325198.
Supplementary European Search Report, dated May 16, 2018, for European Patent Application No. EP 15 84 6672.

* cited by examiner

BONNET MOUNTING APPARATUS OF AGRICULTURAL WORK VEHICLE

CROSS-REFERENCE TO RELATED APPLICATION(S)

The present application is a U.S. National Phase entry from International Application No. PCT/KR2015/005921, filed Jun. 12, 2015, which claims priority to Korean Patent Application No. 10-2014-0131821, filed Sep. 30, 2014, the disclosure of which is incorporated by reference herein in its entirety.

BACKGROUND OF THE INVENTION

1. Technical Field

The present invention relates to an apparatus for mounting a bonnet. More particularly, it relates to a bonnet mounting apparatus of an agricultural work vehicle, the apparatus enabling the bonnet that covers an engine compartment of the agricultural work vehicle to be opened upward.

2. Background Art

As well known in the art, among agricultural work vehicles, a tractor is used for plowing the ground. Such a vehicle includes front wheels that work as steering wheels and rear wheels whose diameter is larger than the front wheels. Also, a driver's cockpit for operating the vehicle is disposed in the vehicle body between the front wheels and the rear wheels. In addition, an engine and peripheral engine components are mounted in an engine compartment in front of the driver's cockpit, and a bonnet (an engine compartment hood) covers the engine compartment for protection thereof.

The bonnet of the conventional tractor as above generally adopts a hinged structure at a rear portion of the bonnet to rotate the front of the bonnet upward for accessing the engine compartment. This is because a method of opening the bonnet at the front of the vehicle body is more advantageous than a method of opening the bonnet at the rear thereof, which is adjacent to the driver's cockpit.

FIG. 1a is a view showing a bonnet mounting structure of a conventional tractor for opening a bonnet from the front part of a vehicle body.

With reference to FIG. 1a, a hinge plate 100 fixed to the bonnet by bolting is hingedly coupled to a hinge bracket 210 on a bonnet mounting board 200 in the engine compartment to be rotatable. In addition, dampers 300 are provided in such a way that one end thereof is coupled to the front end of the hinge plate 100 to be rotatable and the other end thereof is supported by the bonnet mounting board 200 so as to help the opening of the bonnet.

The mounting structure of FIG. 1a is realized as follows. The hinge plate 100 is preferentially assembled on the bonnet B, and the bonnet B on which the hinge plate 100 is assembled is lifted by a hoist crane, etc., as shown in FIG. 1b, and is moved to an engine compartment of a vehicle to which the bonnet is to be attached. Then, a pin or a bolt is manually fitted after matching a connecting portion 102 of the hinge plate 100 to the hinge bracket 210.

Accordingly, auxiliary manpower (manpower for adjusting a hoist, manpower for guiding an exact assembling position of the bonnet, manpower for assembly, etc.) is required to mount the bonnet to the vehicle. Thus, assembly is not easy because it is difficult to match a hinge hole to two components for coupling the hinge, and much time is spent on assembling work. Also, it is hard to reduce production costs because of the number of components.

SUMMARY OF THE INVENTION

The present invention is intended to propose a bonnet mounting apparatus of an agricultural work vehicle, the apparatus improving bonnet assembling work efficiency and reducing production costs, and realizing great reductions in auxiliary manpower and man-hours when assembling the bonnet.

In order to accomplish the above object, the present invention provides a bonnet mounting apparatus of an agricultural work vehicle, the bonnet mounting apparatus including: a fastener on which a coupling protrusion is provided, and which is attached to the inside of one end portion of a bonnet; and a hinge on which a coupling recess is provided, and which is hingedly coupled to an upper end of a bonnet support of a vehicle body side so as to be rotatable upward and downward, thereby being mounted by inserting the coupling protrusion of a bonnet side into the coupling recess of the hinge of the vehicle body side.

According to an embodiment of the present invention, a latching fixing part may be provided on a part of a circumference of the coupling protrusion, and a latching projection, which engages with the latching fixing part, may be provided on the coupling recess. Also, the latching projection may elastically be moved outward when the coupling protrusion is inserted into the coupling recess.

In this case, the coupling protrusion may be formed in a triangular shape whose width tapers in a downward direction.

In addition, the end part of the hinge, which is the opposite side of a portion hingedly coupled to the bonnet support, may be fixed by a bolt to one side of the fastener.

According to another embodiment of the present invention, ball grooves may be provided on opposite sides of a neck portion of the coupling protrusion, and ball plungers may be provided on the coupling recess, the ball plungers including: balls partially positioned in the ball grooves when the coupling protrusion is completely inserted into the coupling recess so as to prevent detachment of the coupling protrusion from the coupling recess; and springs for elastically supporting the balls.

Advantageous Effects

According to an embodiment of the present invention, a bonnet may stably be fixed to the front of a vehicle body to be openable upward by simple work, i.e., inserting a coupling protrusion of a bonnet side into a coupling recess of a hinge of a vehicle body side. In other words, the present invention has an advantage of greatly improving assembling work efficiency by using a simple structure without a complicated hinge assembly as in the conventional technique.

In addition, due to the simple structure, great reductions not only in the number of components required for mounting the bonnet but also in man-hours for assembly may be realized. Thus, time and manpower spent on work and production costs may greatly be cut down. Moreover, since difficult work, such as matching a hinge hole in the state of floating the bonnet in the air as in the past, is eliminated, great improvements in work efficiency and mass production may be expected.

DETAILED DESCRIPTION OF THE INVENTION

Hereinafter, the embodiments of the present invention will be described with reference to the accompanying drawings. In the following description of the present invention, detailed descriptions of known constructions will be omitted, and detailed descriptions of constructions will also be omitted if they make the subject matter of the present invention unclear.

Figure 1A:
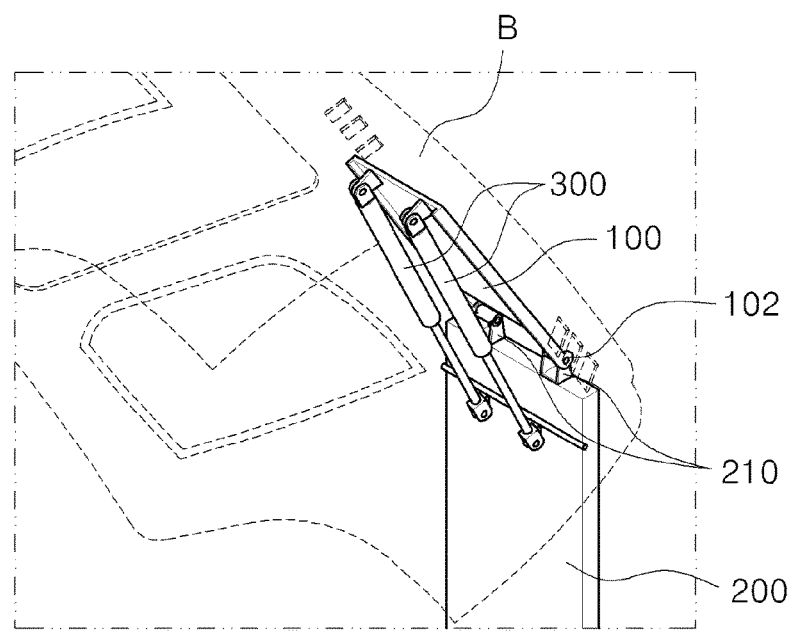
FIGS. 1a and 1b are views showing a conventional structure for openably mounting a bonnet to a front part of an agricultural work vehicle.
Figure 1B:
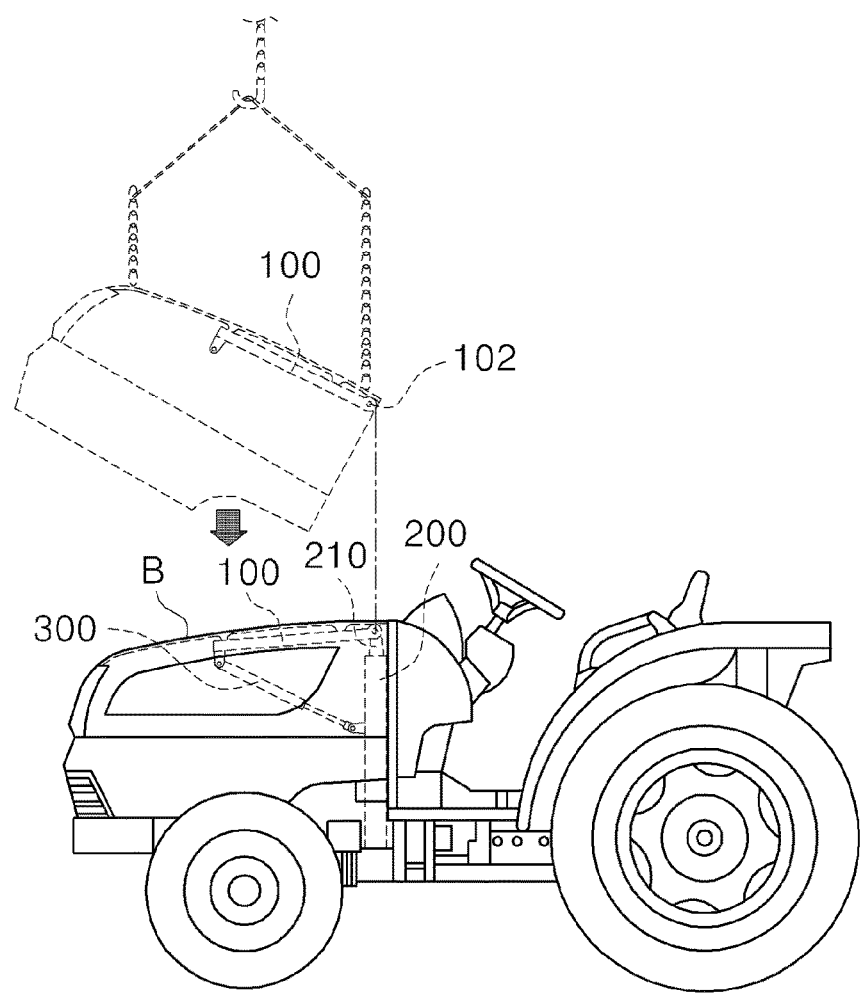
Figure 2:
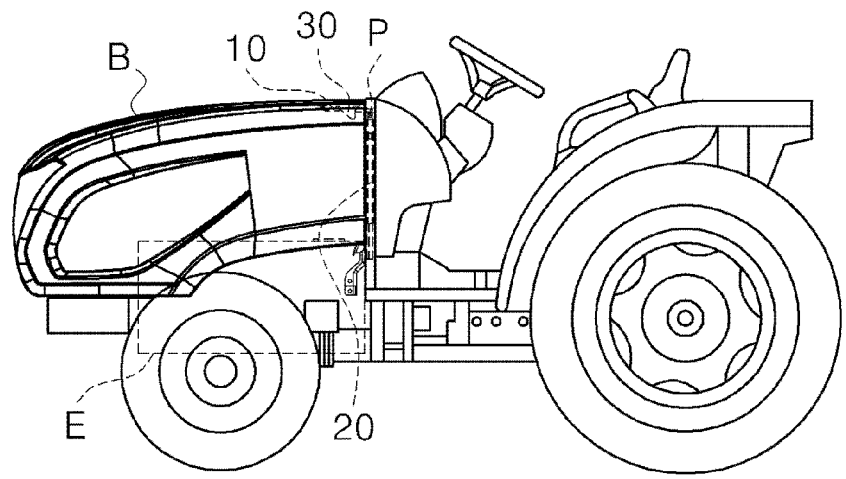
FIG. 2 is a schematic side view of a bonnet mounting apparatus of an agricultural work vehicle according to an embodiment of the present invention.
Figure 3:
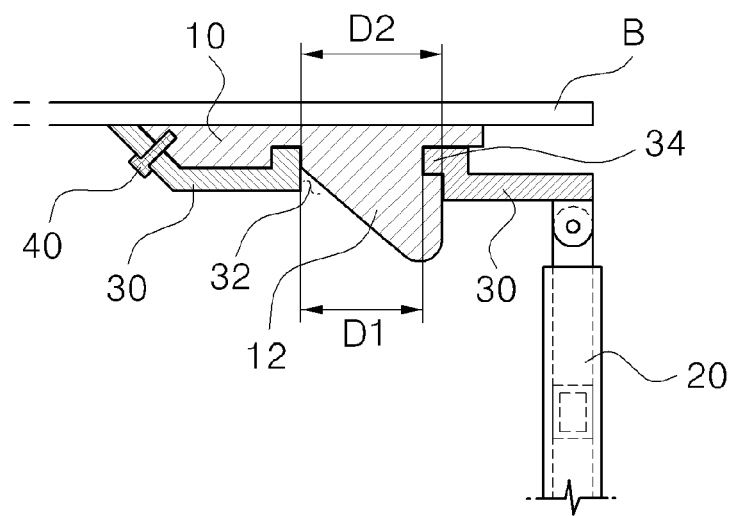
FIG. 3 is a side view of the bonnet mounting apparatus according to a first embodiment of the present invention, after the apparatus is assembled.

FIG. 2 is a schematic side view of a bonnet mounting apparatus of an agricultural work vehicle according to an embodiment of the present invention, and FIG. 3 is a side view of the bonnet mounting apparatus according to a first embodiment of the present invention, after the apparatus is assembled. In addition, FIG. 4 is a view showing a process of assembling the bonnet mounting apparatus according to the first embodiment of the present invention.

As illustrated in the figures, the bonnet mounting apparatus according to the embodiments of the present invention realizes a structure for opening a bonnet B frontward where a front side of the bonnet B positioned in front of a vehicle body with respect to a pivot point P is lifted to open an engine compartment by mounting the bonnet on a vehicle body to form the pivot point P on a rear part of the bonnet B adjacent to a driver's cockpit of an agricultural work vehicle, preferably a tractor.

Figure 4:
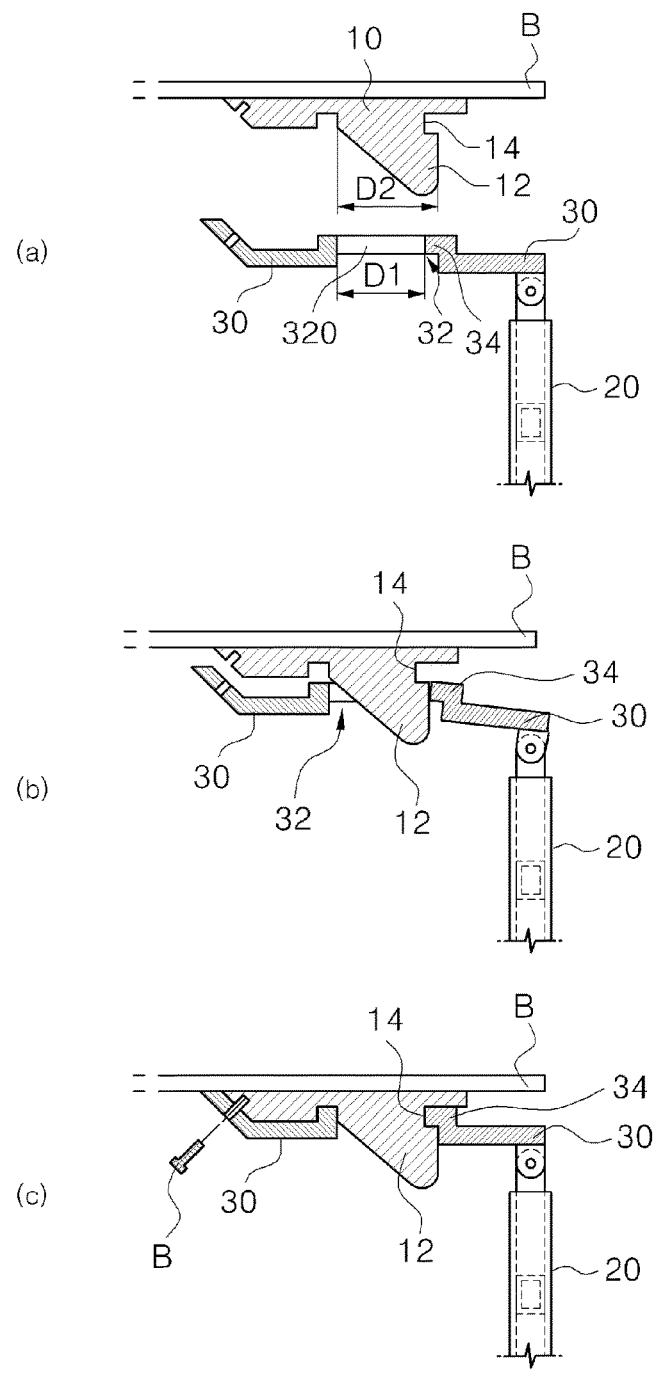
FIG. 4 is a view showing a process of assembling the bonnet mounting apparatus according to the first embodiment of the present invention.

With reference to FIGS. 2 to 4, the bonnet mounting apparatus is mainly composed of a fastener 10 disposed on a bonnet B side, and a hinge 30 to which the fastener 10 is coupled and which is disposed on a vehicle body side. In regards to this, the fastener 10 is provided on a part of an inner end portion of the bonnet B, and includes a coupling protrusion 12. In addition, the hinge 30 is arranged on the top of a bonnet support 20 of the vehicle body side to be vertically rotatable, and includes a coupling recess 32 into which the coupling protrusion 12 is inserted.

According to the first embodiment illustrated in FIGS. 3 and 4 of the present invention, a latching fixing part 14 is provided on a part of a circumference of the coupling protrusion 12 of the fastener 10, and a latching projection 34 that engages with the latching fixing part 14 is provided on the coupling recess 32. The coupling recess 32 is formed to have a size into which the coupling protrusion 12 is insertable, and a straight or curved contact surface is formed between the latching projection 34 and the latching fixing part 14 when the coupling recess 32 and the coupling protrusion 12 are engaged with each other.

An aperture 320 is formed on the coupling recess 32 of the hinge 30 to have a size into which the coupling protrusion 12 of the fastener 10 is insertable. In this case, the width D1 of the aperture is formed to be slightly smaller than the upper diameter D2 of the coupling protrusion 12 of the fastener 10. In addition, the latching projection 34 is constructed to be elastically movable outward. Thus, the aperture 320 can temporarily be extended when the coupling protrusion 12 is inserted into the coupling recess 32.

In other words, the latching projection 34 arranged on the coupling recess 32 is constructed to be movable outward. Accordingly, in the case of connecting the bonnet B to the vehicle body by inserting the coupling protrusion 12 of the fastener 10 into the coupling recess 32 of the hinge 30, the latching projection 34 returns to an original position to restrict the coupling protrusion 12 when reaching a position where the latching projection 34 engages with the latching fixing part 14 after being temporarily pushed outward by the coupling protrusion 12 as shown in FIG. 4.

According to the first embodiment of the present invention, the coupling protrusion 12 may be formed in a triangular shape whose width tapers in a downward direction. In addition, the end portion of the hinge 30, which is opposite to a portion hingedly coupled to the bonnet support 20, may be fixed to one side of the fastener 10 by a bolt 40 in the state of coupling the fastener 10 of a bonnet side to the hinge 30 of the vehicle body side by inserting the coupling protrusion 12 into the coupling recess 32.

The bonnet mounting apparatus according to the first embodiment of the present invention is a structure where the fastener 10 is stably fixed to the hinge 30 by fastening the bolt 40 to one side after coupling two components (the fastener 10 and the hinge 30) by inserting the coupling protrusion 12 of the bonnet side into the coupling recess 32 of the hinge 30 of the vehicle body side. Accordingly, the bonnet B can stably be fixed to the front of the vehicle body to be openable upward by simple work.

Figure 5:
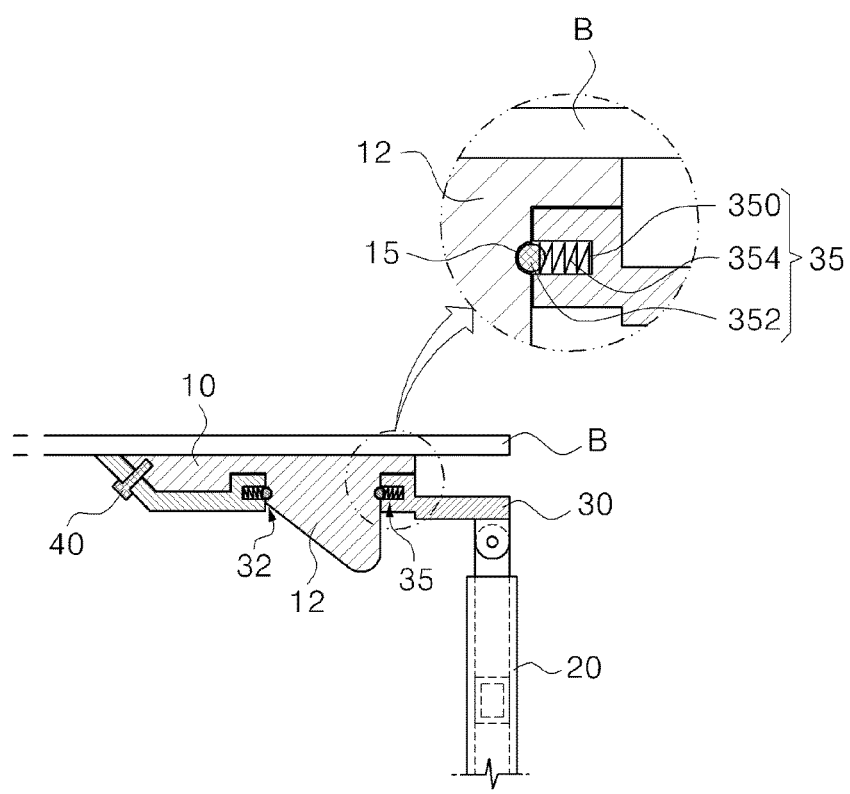
FIG. 5 is a side view of the bonnet mounting apparatus according to a second embodiment of the present invention, after the apparatus is assembled.

FIG. 5 is a side view of the bonnet mounting apparatus according to the second embodiment of the present invention, after the apparatus is assembled. Hereinafter, in order to describe the second embodiment of the present invention, the same terms will be used and the same reference numerals will be assigned with respect to the same elements previously mentioned for the bonnet mounting apparatus of the first embodiment. In addition, repeated descriptions of the same parts will be omitted.

With reference to FIG. 5, according to the second embodiment of the present invention, ball grooves 15 are provided on opposite sides of a neck portion of the coupling protrusion 12 provided on the fastener 10 of the bonnet side. In addition, ball plungers 35, which have elasticity toward the ball grooves 15 to tightly contact therewith, are provided on opposite ends at an aperture side of the coupling recess 32 when the bonnet mounting apparatus is assembled in the form of completely inserting the coupling protrusion 12 into the coupling recess 32 of the hinge 30 of the vehicle body side.

The ball plungers 35 according to the second embodiment of the present invention may be a construction where ball seats 350 are concavely formed at regular intervals in a longitudinal direction of the hinge 30 on the opposite ends at the aperture side, balls 352 are received on each of the ball seats 350, and springs 354 are intervened between the balls 352 and the ball seats 350 such that parts of the balls 352 elastically contact with the ball grooves 15 after assembly so as to block the detachment of the coupling protrusion 12.

According to the second embodiment of the present invention, in the case of inserting the coupling protrusion 12 of the bonnet side into the coupling recess 32 of the hinge 30 of the vehicle body side, the ball plungers 35 retract and return to the original position when the coupling protrusion 12 is completely inserted so as to generate restriction force such that the fastener 10 can easily be connected to the hinge 30. In other words, the bonnet B can easily and rapidly be coupled to the vehicle body.

According to the embodiments of the present invention as aforementioned, the bonnet can be stably fixed to the front of the vehicle body to be openable upward by simple work, i.e., inserting the coupling protrusion of the bonnet side into the coupling recess of the hinge of the vehicle body side. In other words, the present invention has an advantage of greatly improving assembling work efficiency by using a simple structure without a complicated hinge assembly as in the conventional technique.

In addition, due to the simple structure, great reductions not only in the number of components required for mounting the bonnet but also in man-hours for assembly may be realized. Also, time and manpower spent on work and production costs may greatly be cut down. Moreover, since difficult work, such as matching a hinge hole in the state of floating the bonnet in the air as in the past, is not accompanied, great improvements in work efficiency and mass production may be expected.

In the aforementioned detailed descriptions of the present invention, only specific embodiments have been described. However, the present invention should not be considered as being limited to specific forms mentioned in the detailed descriptions, but should rather be considered as including various modifications, additions and substitutions within the scope and spirit of the present invention as disclosed in the accompanying claims.

| <Description of the Reference Numerals in the Drawings> | |
|---|---|
| 10: Fastener | 12: Coupling protrusion |
| 14: Latching fixing part | 15: Ball groove |
| 20: Bonnet support | 30: Hinge |
| 32: Coupling recess | 34: Latching projection |
| 35: Ball plunger | 40: Bolt |
| B: Bonnet | |

What is claimed is:

1. A bonnet mounting apparatus of an agricultural work vehicle, the bonnet mounting apparatus comprising:

a fastener on which a coupling protrusion is provided, and which is attached to an inside of one end portion of a bonnet; and a hinge on which a coupling recess is provided, and which is hingedly coupled to an upper end of a bonnet support at a vehicle body side so as to be rotatable upward and downward, thereby allowing the bonnet to be mounted by inserting the coupling protrusion of the bonnet into the coupling recess of the hinge at the vehicle body side, wherein a latching fixing part is provided on a part of a circumference of the coupling protrusion, and a latching projection, which engages with the latching fixing part, is provided on the coupling recess, wherein the latching projection is elastically moved outward when the coupling protrusion is inserted into the coupling recess, and wherein an end part of the hinge, which is an opposite side of a portion hingedly coupled to the bonnet support, is fixed by a bolt to one side of the fastener.

2. The bonnet mounting apparatus according to claim 1, wherein the coupling protrusion is formed in a triangular shape whose width tapers in a downward direction.

3. The bonnet mounting apparatus according to claim 1, wherein ball grooves are provided on opposite sides of a neck portion of the coupling protrusion, and ball plungers are provided on the coupling recess, the ball plungers comprising: balls partially positioned in the ball grooves when the coupling protrusion is completely inserted into the coupling recess so as to prevent detachment of the coupling protrusion from the coupling recess; and springs for elastically supporting the balls.

* * * * *